United States Patent
Xu

(10) Patent No.: US 8,655,639 B2
(45) Date of Patent: Feb. 18, 2014

(54) GENERAL DIGITAL SEMANTIC DATABASE FOR MECHANICAL LANGUAGE TRANSLATION

(76) Inventor: Wenhe Xu, Liaoning Province (CN)

( * ) Notice: Subject to any disclaimer, the term of this patent is extended or adjusted under 35 U.S.C. 154(b) by 560 days.

(21) Appl. No.: 12/999,312

(22) PCT Filed: Jun. 5, 2009

(86) PCT No.: PCT/CN2009/072144
§ 371 (c)(1),
(2), (4) Date: Dec. 16, 2010

(87) PCT Pub. No.: WO2009/152732
PCT Pub. Date: Dec. 23, 2009

(65) Prior Publication Data
US 2011/0238404 A1  Sep. 29, 2011

(30) Foreign Application Priority Data
Jun. 19, 2008  (CN) .......................... 2008 1 0011904

(51) Int. Cl.
*G06F 17/28* (2006.01)

(52) U.S. Cl.
USPC ...................................... 704/2; 704/3; 704/4

(58) Field of Classification Search
USPC ........................................................ 704/2–8
See application file for complete search history.

(56) References Cited

U.S. PATENT DOCUMENTS

| 5,497,319 | A | * | 3/1996 | Chong et al. ...................... 704/2 |
| 5,768,603 | A | * | 6/1998 | Brown et al. ...................... 704/9 |
| 6,161,083 | A | * | 12/2000 | Franz et al. ....................... 704/4 |
| 6,233,546 | B1 | * | 5/2001 | Datig ................................ 704/7 |
| 6,658,627 | B1 | * | 12/2003 | Gallup et al. ................. 715/236 |
| 2006/0217963 | A1 | * | 9/2006 | Masuichi et al. ................. 704/7 |

* cited by examiner

*Primary Examiner* — Jesse Pullias

(57) ABSTRACT

A general digital semantic database for mechanical language translation is provided. The database has vocabulary decomposed to part of speech characteristics and semantic characteristics to form inseparable basic semantic points. The vocabulary is regularly ordered according to classes of the semantic characteristic, part of speech characteristic, background and grammatical relation. Two or more languages are configured on the basic semantic points according to a synonymies relation. The languages are discretionarily interchanged based on the basic semantic points by a machine. The languages semantemes and syntax relation formula are configured in the semantic database to realize an automatic paginal translation.

9 Claims, 3 Drawing Sheets

GENERAL DIGITAL SEMANTIC DATABASE FOR MECHANICAL LANGUAGE TRANSLATION

BACKGROUND OF THE INVENTION

The present invention relates to mechanical language translation of various languages and more specifically relates to a digital language semantic database for machines.

Currently, use of mechanical language translation is based on character database (GB2312) and word database (GB1375). Dictionaries are the sources of the main contents of a word database. Phonetic sound codes, visual form codes and sound-form codes used during an encoding procedure are all the characteristics of dictionaries. Dictionaries have always been serving humans for the purposes of referencing, making judgment and selective learning. When mechanical language translation is based on dictionaries, machines will be required to think and judge as humans. Such requirements are currently met by setting up various technical parameters, identification modules and vector modules. However, as language is a fairly complicated discipline which experts describe as something that could not be put in order, it is very difficult to solve all the problems via technical means such as semantic meaning trees, real parameter pruning and virtual parameter pruning. As a result, one can imagine the quality of a mechanical translated text.

Owing to the limited intelligence of machines, the main purpose of processing natural language signals is to enable machines to read and understand natural languages of humans, in other words, to enable machines to simulate the language mechanisms of humans. At this present stage, it is extremely unrealistic to expect machines to be as intelligent as humans.

The common technology at present comprises extracting a source text to be compared and segmented against a word database, spreading the identified word according to a word-formation semantic unit denotation database (tree) for semantic analysis and pruning and finally selecting the eventually determined semantic meaning. This technology is called semantic translation. A description according to patent application number 200310011433.X is quoted herein as follows: "Extract a sentence from the source text: analyze the sentence by using a semantic unit denotation database (tree) to obtain the semantic expression of the sentence, spread the semantic expression of the sentence according to the semantic unit denotation database using the expression of the target language and then output the spread sentence as the translated text." (Line 20 to 23 on page 1 of the description). The above description discloses the common method currently adopted by all kinds of language translation.

It is known that a language is formed by words and a word is constituted by phonetic sound, visual form and semantic meaning. Different languages are characterized by their own phonetic sounds and visual forms while semantic meanings of different languages are shared in common. Only because of semantic meanings could there be intercommunication between different languages. If semantic meanings are stored in a machine, any language could be completely formed by integrating the semantic meanings with its own phonetic sounds and visual forms.

Even though semantic meanings alone are freely interchangeable between different languages, this is far from enough for the purpose of translation as it is also necessary to accommodate the language habits of different languages. Accordingly, adjustment in syntactic relationships between different languages has to be made. In order to establish syntactic relationships, part-of-speech characteristics, semantic characteristics and also language context of each word are required. In the absence of the foregoing, syntactic relationship could not be established.

In view of the above, the present invention provides an integrated solution.

BRIEF SUMMARY OF THE INVENTION

According to an aspect of the present invention, digits of a digital semantic database for use by mechanical language translation are formed by Arabic numerals and they are vertically divided into several levels of groups. The first level consists of 2-digit numbers from 00 to 99. The second level consists of 4-digit numbers from 0000 to 9999 and is formed by expanding any group in the first level by 100 times. The same goes on for next level. Every number in an additional level of groups has two more digits. In a specific example, number 99 in the first level of groups is divided into 9900 to 9999 in the second level. Likewise, number 9999 in the second level of groups is further divided into 999900 to 999999 in the third level. If there are 9 levels of groups in total, there will be 10 billion times 100 million sets of digits in total, meaning that 10 billion times 100 million semantic points could be established. Alternatively, digits could be substituted by letters or symbols, for example AA, AB AC . . . in the first level, AAAA, AAAB, AAAC . . . in the second level and AAAAAA, AAAAAB, AAAAAC in the third level. Each level of groups may consist of 1-digit numbers or 3-digit numbers. The fewer are the digits, the more are the levels of groups; the more are the digits, the fewer are the levels of groups.

According to another aspect of the present invention, semantic meanings in a digital language semantic database for use by mechanical language translation are not identified by phonetic sounds or visual forms but consist only of sets of digits for identification and operation by machines and so they are called machine digital language. The contents of a semantic database for identifying semantic meanings are formed by several semantic units and each semantic unit, which is called basic semantic point according to the present invention, is associated with only one semantic meaning. Since there are no phonetic sound codes or visual form codes but only semantic meanings, once the basic semantic points of the semantic database of the present invention are matched with the semantic points of any language, the corresponding phonetic sounds and visual forms of that language constitute that language.

According to yet another aspect of the present invention, the present invention provides a method for a machine to identify the external characteristics being part-of-speech characteristics and background scope of each basic semantic point. According to the present invention, each basic semantic point is associated with a set of digits. The vertically arranged sets of digits are divided into several levels. In the first level, there are 2-digit numbers, and the semantic points within this range represent the broadest scope and the highest part-of-speech zone. 2 more digits are added to the numbers in the next level of groups and within this range, the basic semantic points fall within the scope of the previous level of groups and their part-of-speech characteristics are middle part-of-speech zones or low part-of-speech zones. Within the same level of groups, only the last 2 digits of each number are different. All basic semantic points within this range are similar in respect of semantic meaning and the same in respect of part-of-speech and scope. Therefore, their relationship is called parallel relationship. However, different levels of groups crosswise are different in their first digits. Within this range, parts of speech and scopes are different for all the basic semantic points. Therefore, the relationship between different levels of groups is called cross relationship.

Categorize all basic semantic points according to the scopes to which the part-of-speech characteristics belong, ranges and semantic characteristics and then arrange them in sequence according to the rules stipulated above to form a machine digital semantic database and thereby form a machine digital language.

According to yet another aspect of the present invention, the present invention provides all basic semantic points in a digital semantic database for identification by a machine. Two or more kinds of languages with different phonetic sounds and visual forms are arranged in parallel to each other in the same format, and the machine will interchange automatically and freely between the two or more kinds of languages. Since the part-of-speech characteristics, the respective scope and the contextual background demonstrated by a basic semantic point itself totally match with one another, the machine would carry out rearrangement of sequence based on determined grammatical rules and commands of syntactic formulae to output a translation that fits the language habit of any language.

According to yet another aspect of the present invention, the present invention provides all basic semantic points in a digital semantic database for identification by a machine which demonstrate their part-of-speech characteristics at positions identified vertically with digits and horizontally with levels of groups, whereas 12 parts of speech are set to be the high part-of-speech zones in the database of the present invention according to grammatical rules. Take noun for an example: The high part-of-speech zone of noun is divided into the middle part-of-speech zones of movable object and unmovable object, and the low part-of-speech zones of active movement and passive movement. The active movement zone is divided into animal and plant whereas animal is further divided into human, bird, beast, insect and fish. The high part-of-speech zone of verb is divided into transitive verb zone and intransitive verb zone. The middle part-of-speech zone of transitive verb is then divided into transitive-movable verb zone and transitive-unmovable verb zone. The low part-of-speech zone of transitive-movable verb is further divided into driven verb zone and driving verb zone. The action of a verb is related to the zone of noun: the active movement word zone of noun manipulates the driven verb zone of verb while unmovable noun accepts the driven verb zone. The high part-of-speech zone of adverb is divided into the middle part-of-speech zones of degree and frequency and so forth and under which is divided into the low part-of-speech zone etc. The other 9 high parts of speech are divided under the same principle. All semantic points are categorized one by one using the method above according to their respective part-of-speech and semantic characteristics so that a machine could acquire more definite knowledge of all the external relationships of all basic semantic points such as their part-of-speech characteristics, semantic characteristics and background characteristics for more accurate judgment and specification when it operates a syntactic formula.

According to yet another aspect of the present invention, the present invention provides a part-of-speech identifier for all basic semantic points in a digital semantic database for identification by a machine. In the semantic database, all part-of-speech zones are identified using different colours. As a result, when an individual phrase cannot be differentiated by means of syntactic formula identification, background technology identification and language context identification and thus indicates the existence of multiple possibilities, these several sentence patterns will be shown at the same time so that an input operator could identify them and then determine by secondary manual intervention. When entering various terms, enter the identifying noun colours of the terms.

According to yet another aspect of the present invention, the present invention provides a logical sequencing pattern, method and application of basic semantic points in a digital semantic database for identification by a machine. The kind of relationship between vertically arranged levels of groups is subordinate relationship in which a level of groups consisting of more digits is subordinate to a level of groups consisting of fewer digits. Such relationship is the basis for the judgment of language contexts and background relationships. The difference in the values between digits in the same level of groups forms a parallel relationship wherein all basic semantic points share same external characteristics and each of them functions independently. The first digit of all vertically arranged basic semantic points are the same; if not, such basic semantic points belong to other scopes. The crossing of semantic meanings between different scopes forms a cross relationship. Such relationship is determined by the part-of-speech characteristics of the high, middle and low part-of-speech zones and is divided into crossable and non-crossable zones. The relationship within a crossable zone is cross relationship while the one within a non-crossable zone is opposite relationship. The classification and ordering of basic semantic points have to be made with detailed consideration of each semantic point and with other factors integrated and taken into account.

According to yet another aspect of the present invention, the present invention provides a method to identify the background relationships of all basic semantic points in a digital semantic database for identification by a machine. The language context of a background relationship could be determined via the sameness of vertically arranged numbers in their first digit and their first three, five and seven digits. This is an additional method to identify sentence patterns especially for words having the same part-of-speech and forming the same sentence pattern. By searching the preceding and the succeeding sentences for background of the same scope, priority rank could be determined. The background and language context can be determined from the sameness of the first digit or the first three or five digits. The one having the largest total number of digits in common is selected by the machine as the highest priority rank.

According to yet another aspect of the present invention, the present invention provides the functions of all basic semantic points in a digital semantic database for identification by a machine in different sentence patterns. Since the part-of-speech characteristics of all basic semantic points are determined by grammatical rules, traditional parts of speech could no longer satisfy the syntactic requirements of the present invention. Only when the traditional parts of speech are further divided in detail could the new syntactic requirements be satisfied. For example, words in the driven verb zone such as 走 (walk), 跑 (run), 到 (arrive), 来 (come) and 去 (go) do not agree with words in the word zones of the noun divisions of) 动物 (animal), 处所 (place) 时间 (time), 服饰 (clothing) and 建材 (building material) in terms of syntactic combination, wherein the word zone of the noun of animal manipulates the word zone of driven verb while the word zone of the noun of place could only accept the word zone of driven verb. Take the adverb of degree and adverb of frequency as another example, the former one could only modify adjectives and the latter one could only combine with verbs. Therefore, the most important basis of setting up syntactic formulae and of judging and identifying semantic meanings is to determine especially the characteristics that divide middle and low part-of-speech zones and the relationships between different parts of speech. New syntactic formulae are set up to determine contextual backgrounds according to subordinate relationships between semantic meanings. A kind of syntactic relationship may correspond to many semantic relationships and a kind of semantic relationship may also be expressed via many syntactic relationships. There are limited syntactic forms but unlimited semantic meanings. The inevitable consequence of expressing unlimited contents by limited forms is the existence of one-to-many relationships. As a result, the only way to increase the quality of mechanical language translation is to set up more comparable choices and exclusive choices for a machine to process syntactic forms.

BRIEF DESCRIPTION OF THE DRAWINGS

The present invention is further described below with reference to the accompanying drawings.

FIG. 1A illustrates a verb zone. FIG. 1B illustrates an adjective zone. FIG. 1C illustrates an adverb zone. In the figures, each set of digits represents an independent basic semantic point. In this embodiment, entry associated with each set of digits contains Chinese but it could also contain the phonetic sound and visual form of any other language associated with the same semantic meaning. Alternatively, the entry may contain a plurality of languages in parallel. The entry in brackets contain synonym and all synonyms are associated with only one basic semantic point. Designate a word as in a priority rank, for example the word 死 (die) is in the priority rank in comparison with word 老 (old) in the verb zone, the word 很 (very) is in the priority rank in comparison with the word 老 (old) in the degree word zone, the words 经常 (always) is in the priority rank in comparison with the word 老 (old) in the frequency word zone and the words 许久 (for long) is in the priority rank in comparison with the word 老 (old) in the tense word zone. In the animal-descriptive adjective zone, the semantic meaning of the word 老 (old) is aged. In the object-descriptive adjective zone, the semantic meaning of the word 老 (old) is old and outdated. In the plant-descriptive adjective zone, the semantic meaning of the word 老 (old) is withered. Some synonyms are each additionally allocated a set of digits and a part-of-speech code in the next level of groups because they are different in grammatical functions.

DETAILED DESCRIPTION OF THE INVENTION

Figure 1A:
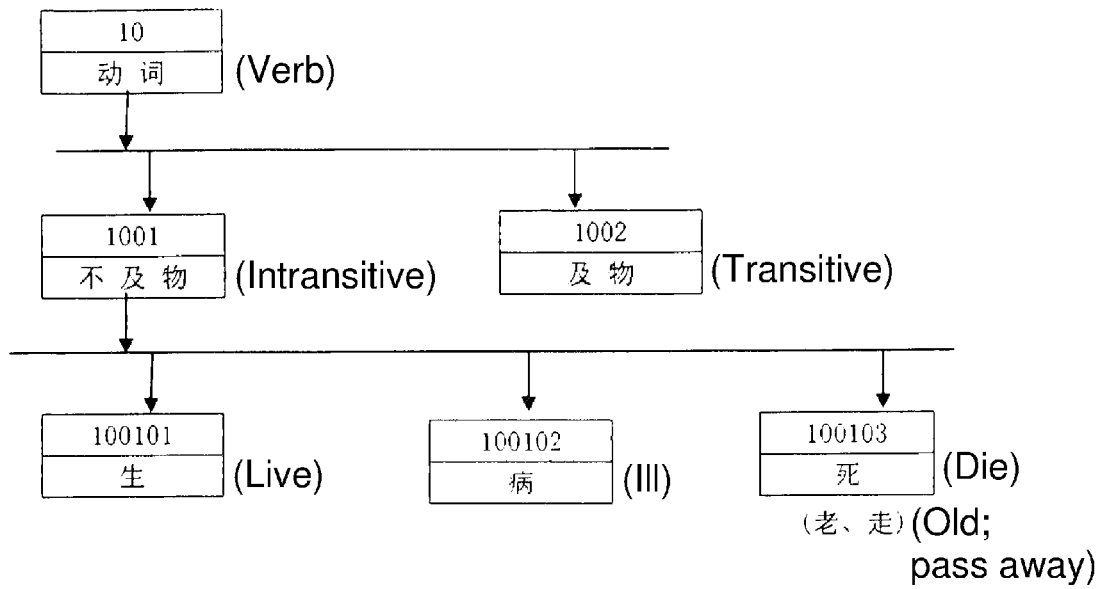
FIG. 1A, FIG. 1B and FIG. 1C are three segments of the general digital semantic database according to the present invention wherein the word 老 (old) is decomposed according to its part-of-speech characteristics and semantic characteristics until no further decomposition is possible, thereby forming a plurality of independent semantic meanings and establishing basic semantic points.
Figure 1B:
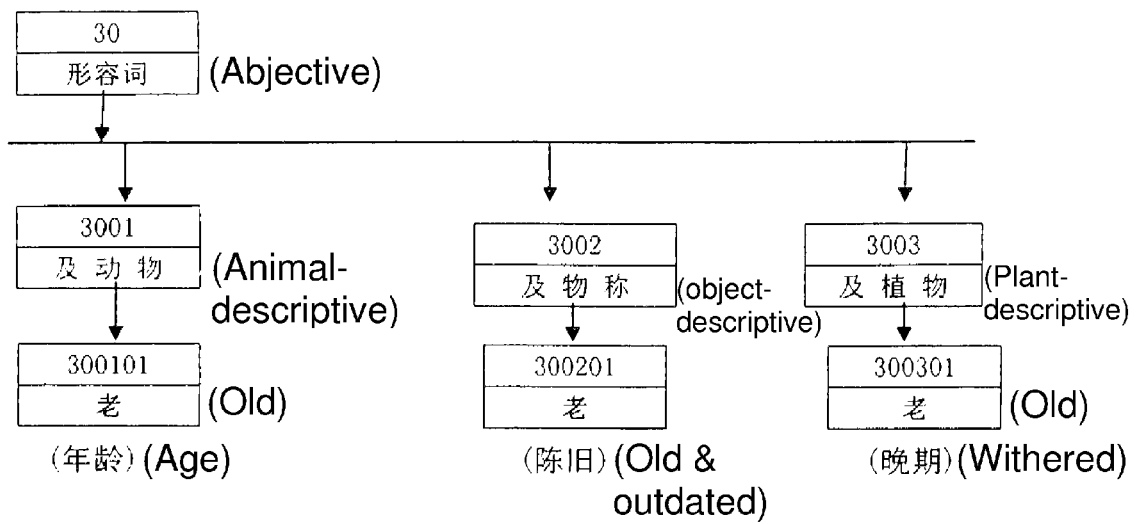
Figure 1C:
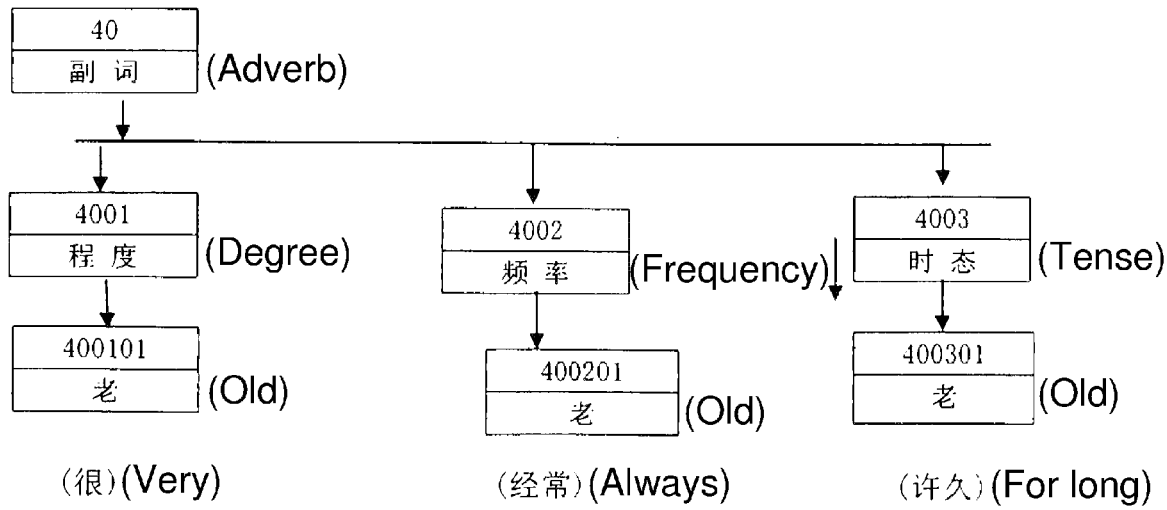
Figure 2:
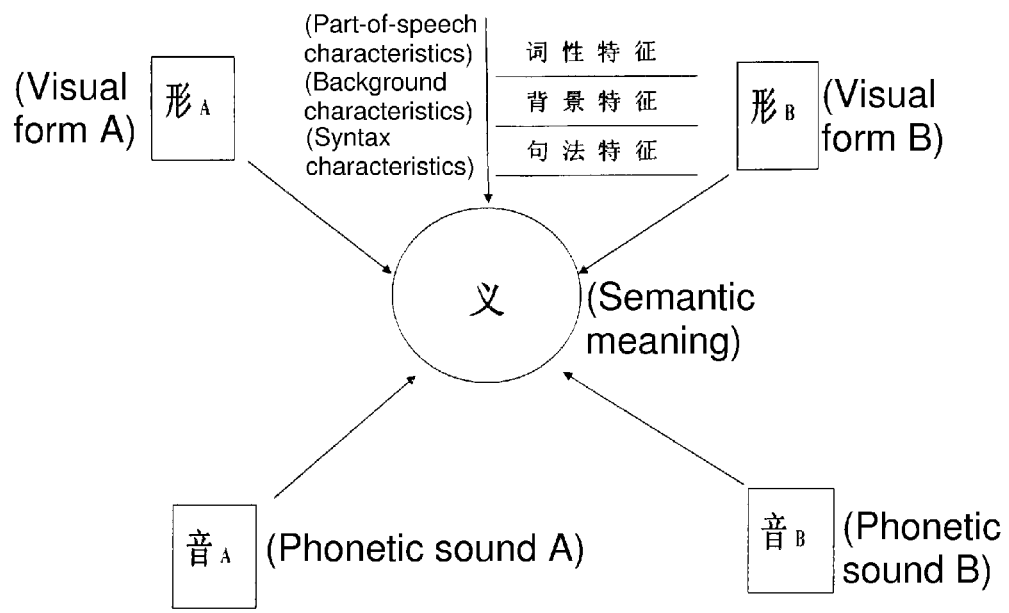
FIG. 2 shows the three major elements of a word according to the present invention and the functional characteristics of semantic meaning. Only semantic meaning could show the part-of-speech characteristics, background characteristics and syntax characteristics. Visual form and phonetic sound are merely the external characteristics of any language. In the figure, the combination of phonetic sound A and visual form A and the combination of phonetic sound B and visual form B indicate whether the corresponding language is A or B, but the point of interchange between language A and language B must be the same semantic meaning. Only if it could be guaranteed that different languages are interchanged via the same semantic meaning could intercommunication and translation between different languages be accurate.
Figure 3:
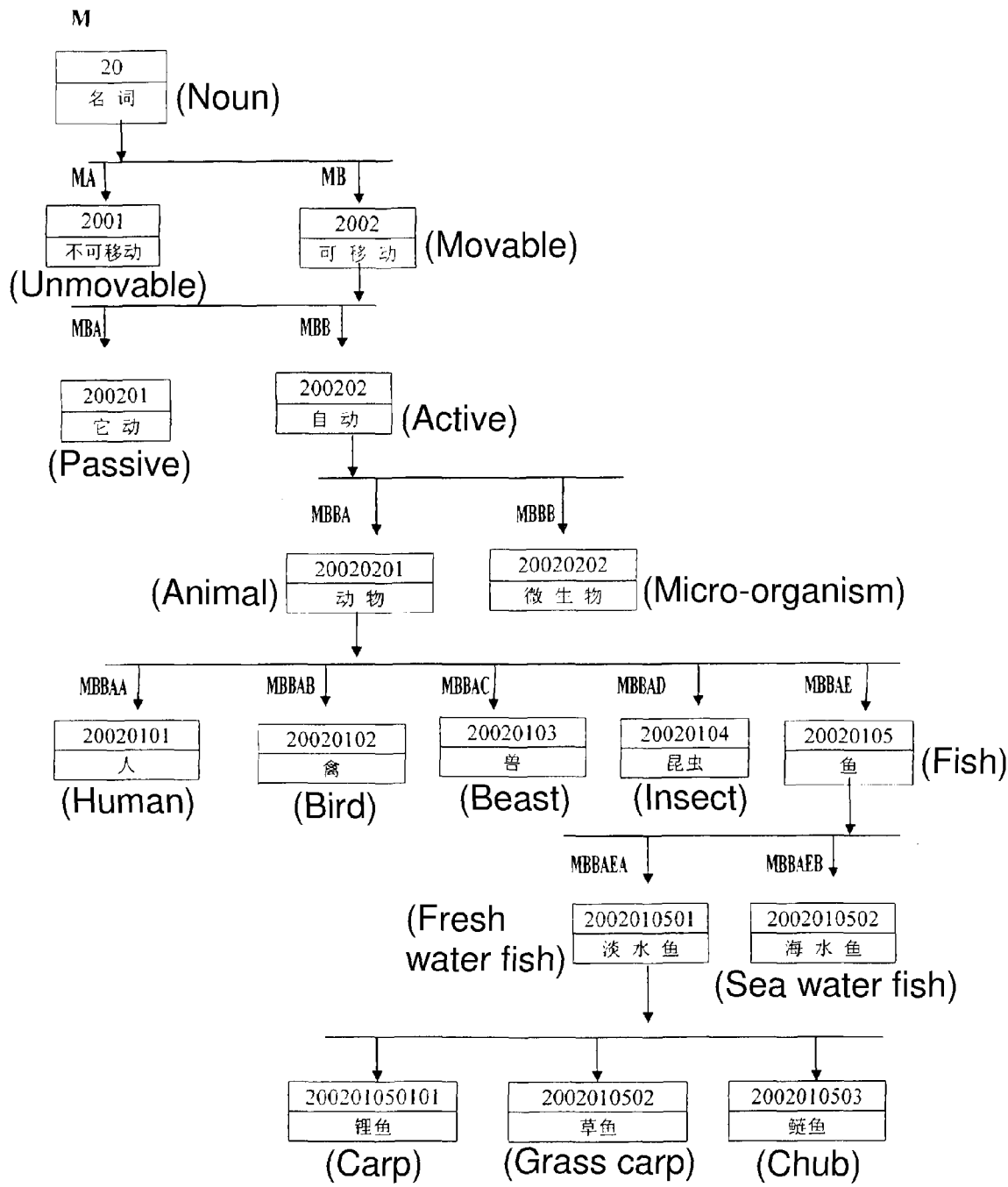
FIG. 3 is a segment of the digital semantic database according to the present invention, wherein the sets of digits represent basic semantic points, and the sets of letters represent part-of-speech zones. The fewer are the letters, the higher is the part-of-speech zone. The more are the letters, the lower is the part-of-speech zone, which is subordinate to higher part-of-speech zone(s). The figure is a segment in a noun zone, wherein the range within an active noun zone could manipulate the range within a driven word zone of a verb zone, for example, 走 (walk), 跑 (run), 去 (go), 到 (arrive), 跳 (jump), 爬 (crawl) and so forth. Unmovable noun zone accepts the range within a driven word zone of a verb zone. Movable noun zone accepts driven verb zone, for example, 搬 (move), 拿 (get), 运 (transport), 挪 (shift), 装 (load), 卸 (unload) and so forth. The above interconnection is the consequence of grammatical rules. The fewer are the digits, the larger is the scope of semantic meaning. The more are the digits, the smaller is the scope of semantic meaning. In the figure, each set of digits only represents one independent semantic meaning of a basic semantic point. The ranges of scopes, contextual backgrounds, subordinate relationships and parallel relationships of the sets of digits are all embodied by the arrangement and combinations within the digital semantic database.

The main focus of the present invention is to provide various identifiers for the external characteristics of each basic point within a semantic database and the purpose of which is to enable a machine to judge and identify accurately the part-of-speech characteristics, especially the low part-of-speech characteristics, and the background characteristics of each semantic point according to grammatical rules and syntactic commands when it conducts language translation. From the use of the Chinese word 老 (old) as shown in FIG. 1, there are 7 entries of the word 老 (old) in a basic semantic meaning database. During conventional word segmentation, only 7 words of the same visual form could be found by means of lateral scan or reverse scan matching and as a result, it could not be judged which one should be adopted. According to the syntactic commands of the present invention, for example 他太老了 (He is too old), adverbs of degree such as 太 (too/so), 非常 (very), 很 (very) could only combine with adjectives according to syntactic formulae. Therefore, only the entry 老(年龄) (i.e. old (aged)) of the animal-descriptive adjective zone will match but not the other six. Such an example shows the process of providing an exclusive choice by a machine through its automatic identification and judgment according to syntactic commands.

In an interchange of multiple languages, there are differences between some languages. In translation between Chinese and English, there are different persons, tenses and the difference between singular and plural forms for verbs in English. Therefore, English could not be directly linked up and interchanged with Chinese. A specific embodiment of how the word 写 (write) is matched and interchanged between Chinese and English is described below with reference to Table 1. In the table, "Digital semantic point" is what we called basic semantic point. "Chinese 1" shows strings of characters scanned and found in a semantic database by using longest matching method according to syntactic formulae and the semantic database in a machine when Chinese characters are input. After successful matching, the corresponding entry under "Chinese priority rank 4" is identified, and successful interchange could then be accomplished by selecting the corresponding entry under "English 2" which is associated with the same semantic meaning point. Under "English priority rank 5", "a" represents first person, "b" represents other persons, "c" represents plural form and "d" represents singular form; they are all the characteristics of English syntax and they are independent semantic meanings which are indispensible and indecomposable for representing relationships between persons and relationships between singular and plural forms in translation of a sentence. Therefore, they could only be listed one by one in order to achieve complete interchange.

An embodiment of selecting language context and background according to the present invention is further described below with reference to Table 2 and Table 3. The part-of-speech of the English word "bank" is "Mfa" in both Table 2 and Table 3. However, their digital semantic meaning points are not the same: 2330401 is 银行 (bank—a place for financial business), 404030203 is 河岸 (bank—a slope bordering a stream course). By examining the structure of digits, the background of 银行 (bank—a place for financial business) is all represented by 233 and this is what we called language context according to the present invention. By using syntactic relationships, thorough top-down searches could be carried out in preceding and succeeding sentences for words under 233, such as 货币 (currency), 财产 (property), 支票 (check). As a consequence, 银行 (bank—a place for financial business) could be determined. The above example shows the crucial effect of language context and background.

According to the present invention, there are limitations with respect to the combination of nouns and verbs, for example, accept and manipulated. 银行 (bank—a place for financial business) belongs to noun-unmovable-place zone and so it accepts driven verbs as 河岸 (bank—a place for financial business) does. However, 银行 (bank—a place for financial business) also has to accept specific verb zones such as 存款 (deposit). 取款 (withdraw). 转账 (transfer). 汇款 (remit) and related verb zones. A specific verb zone is another basis for a machine to select the highest priority rank from a syntactic formula.

An embodiment of processing a sentence 中国人热爱祖国 ("Chinese ardently love the motherland") according to the present invention is further described below with reference to Table 4 and Table 5. Table 4 is a segment from a digital semantic database and each "Digital semantic point" in the table is associated with an entry under "Chinese 1", "English 2", "Part-of-speech 3", "Chinese priority rank 4" and "English priority rank 5" respectively, wherein the entry under "Chinese" which is associated with the semantic code contains 中国人 and 华人, but the associated entry under "Chinese priority rank 4" contains only 中国人 ; the entry under "Chinese" which is associated with the semantic code 302060117 contains 祖国 and 故国, but the associated entry under "Chinese priority rank 4" contains only 祖国 . In other words, even though the original text is 华人热爱故国 , the text after priority rank selection processing will be 中国人热爱祖国 .

Table 5 is a syntactic formula according to the present invention and it is determined based on syntactic rules and part-of-speech characteristics, especially those in relation to middle and low part-of-speech zones, and the relationships between different parts of speech in a sentence. As shown by the "Sentence pattern formula" in Table 5, translation is bilateral from Chinese to English and from English to Chinese. Interchanges of languages and arrangement of word order are accomplished simultaneously by using different syntactic formulae.

The present invention is significant in that:

1. It provides a machine digital language suitable for a machine to automatically identify various natural languages. This kind of machine digital language is formed by semantic meanings only and no visual forms or phonetic sounds are provided for human identification. Therefore, it is only suitable for machines and hence it is called machine language. This kind of machine language should include all basic semantic points that various natural languages have. Semantic points of various natural languages are automatically identified by the machine language so that a natural language is automatically converted into a machine language. Commands are then selected according to language types and after that the machine will automatically convert the machine language into another natural language according to the commands.

2. Machine language analyzes the semantic meanings of various natural languages by using grammatical rules and syntactic formulae and the depth and accuracy of identification should be free of any error unless a syntactic command contains an error or an error is induced by human resulting in inaccurate semantic meaning. As digital semantic meanings serve various functions, machine language could enable a machine to think, analyze and perform integrated judgment as a human does.

3. When machine language identifies each semantic meaning, its definition and analysis of parts of speech have reached the level of a language expert. It does not only define and analyze parts of speech in terms of noun, verb, article, numeral, quantifier and pronoun etc. In contrast, it performs functional analysis with respect to more detailed grammatical rules and syntactic formulae. In relation to processing the cross application of various language contexts and parts of speech, it could also accurately operate to determine the external characteristics of each semantic point. These characteristics are necessary for determining the semantic meanings of semantic points. Semantic meanings could only be accurately determined by means of external characteristics due to the fact that in language communication among humans, languages are also identified by means of the above condition.

TABLE 1

| (Digital semantic point) 数码语义点 | (Chinese 1) 中文 | (English 2) 英文2 | (Part-of-speech 3) 词性3 | (Chinese priority rank 4) 中文优先级 4 | (English priority rank 5) 英文优先级 5 |
|---|---|---|---|---|---|
| 126060168 | 写, 书写 | write | Daab | 写 | e |
| 12606016801 | 写, 书写 | writes | DaabXy | 写 | d |
| 12606016802 | 写过, 书写过 | wrote | DaabGy | 写过 | |
| 12606016803 | 将写, 将书写, 将要写, 将要书写 | shall write | DaabJy-I | 将要写 | a |
| 12606016804 | 将写, 将书写, 将要写, 将要书写 | will write | DaabJy | 将要写 | b |
| 12606016805 | 将写, 将书写, 将要写, 将要书写 | should write | DaabGJy-I | 将要写 | a |

TABLE 1-continued

| (Digital semantic point) 数码语义点 | (Chinese 1) 中文 | (English 2) 英文 2 | (Part-of-speech 3) 词性 3 | (Chinese priority rank 4) 中文优先级 4 | (English priority rank 5) 英文优先级 5 |
|---|---|---|---|---|---|
| 12606016806 | 将写, 将书写, 将要写, 将要书写 | would write | DaabGJy | 将要写 | b |
| 12606016807 | 正在写, 正在书写, 写着, 书写着, 正在书写着, 正在写着, 正写着, 正书写着 | am writing | DaabXj-I | 正写着 | a |
| 12606016808 | 正在写, 正在书写, 写着, 书写着, 正在书写着, 正在写着, 正写着, 正书写着 | are writing | DaabXj-F | 正写着 | e |
| 12606016809 | 正在写, 正在书写, 写着, 书写着, 正在书写着, 正在写着, 正写着, 正书写着 | is writing | DaabXj | 正写着 | d |
| 12606016810 | 正在写, 正在书写, 写着, 书写着, 正在书写着, 正在写着, 正写着, 正书写着 | was writing | DaabGj-D | 正写着 | d |
| 12606016811 | 正在写, 正在书写, 写着, 书写着, 正在书写着, 正在写着, 正写着, 正书写着 | were writing | DaabGj | 正写着 | e |
| 12606016812 | 将正在写着, 将正在书写着, 将正写着, 将正书写着 | shall be writing | DaabJj-I | 将正写着 | a |
| 12606016813 | 将正在写着, 将正在书写着, 将正写着, 将正书写着 | will be writing | DaabJj | 将正写着 | b |
| 12606016814 | 将正在写着, 将正在书写着, 将正写着, 将正书写着 | should be writing | DaabGJj-I | 将正写着 | a |
| 12606016815 | 将正在写着, 将正在书写着, 将正写着, 将正书写着 | would be writing | DaabGJj | 将正写着 | b |
| 12606016816 | 写了, 书写了, 已经写了, 已经书写了 | has written | DaabXw-D | 已经写了 | a |
| 12606016817 | 写了, 书写了, 已经写了, 已经书写了 | have written | DaabXw | 已经写了 | d |
| 12606016818 | 写了, 书写了, 已经写了, 已经书写了 | had written | DaabGw | 已经写完 | e |
| 12606016819 | 将写完, 将书写完 | shall have written | DaabJw-I | 将写完 | b |
| 12606016820 | 将写完, 将书写完 | will have written | DaabJw | 将写完 | a |
| 12606016821 | 将写完, 将书写完 | should have written | DaabGJw-I | 将写完 | b |
| 12606016822 | 将写完, 将书写完 | would have written | DaabGJw | 将写完 | d |
| 12606016823 | 已经写了, 已经书写了 | has been writing | DaabXwj-D | 已经写了 | a |
| 12606016824 | 已经写了, 已经书写了 | have been writing | DaabXwj | 已经写了 | e |
| 12606016825 | 一直写的, 一直书写的 | had been writing | DaabGwj | 一直写的 | |
| 12606016826 | 将已经写了, 将已经书写了 | shall have been writing | DaabJwj-I | 将已经写了 | a |
| 12606016827 | 将已经写了, 将已经书写了 | will have been writing | DaabJwj | 将已经写了 | b |
| 12606016828 | 将已经写了, 将已经书写了 | should have been writing | DaabGJwj-I | 将已经写了 | a |
| 12606016829 | 将已经写了, 将已经书写了 | would have been writing | DaabGJwj | 将已经写了 | b |

TABLE 2

| (Serial number) 序号 | (Chinese 1) 中文 1 | (English 2) 英文 2 | (Part-of-speech 3) 词性 3 | (Chinese priority rank 4) 中文优先级 4 | (English priority rank 5) 英文优先级 5 |
|---|---|---|---|---|---|
| 233 | 金融 | finance, banking | Mda | | finance |
| 23301 | 货币 | currency, money | Mda | | currency |
| 23302 | 资本 | capital | Mda | | |
| 23303 | 货币制度 | monetary system | Mda | | |
| 23304 | 金融机构 | financial institution | Mca | | |
| 2330401 | 银行 | bank | Mfa | | |
| 233040101 | 钱庄 | old-style Chinese private bank | Mfa | | |
| 233040102 | 银号 | banking house | Mfa | | |
| 233040103 | 票号, 票庄 | draft bank | Mfa | 票号 | |

TABLE 3

| 404 | 地理 | geography | Mda | |
| 40401 | 地质 | geology | Mda | |
| 40402 | 陆地 | land, terrene, earth | Mca | land |
| 40403 | 江河湖海 | rivers, streams, lake and sea | Mca | |
| 4040301 | 海洋, 大海 | ocean | Mca | 海洋 |
| 4040302 | 河流, 河 | river | Mca | 河流 |
| 404030201 | 河谷 | river valley | Mfa | |
| 404030202 | 河床, 河身, 河槽 | riverbed | Mfa | 河床 |
| 404030203 | 河岸 | bank | Mfa | |

TABLE 4

| (Digital semantic point) 数码语义点 | (Chinese 1) 热爱 1 | (Semantic database) 语义库 | | (Chinese priority rank 4) 中文优先级 4 | (English priority rank 5) 英文优先级 5 |
|---|---|---|---|---|---|
| | | (English 2) 英文 2 | (Part-of-speech 3) 词性 3 | | |
| 120060102 | 热爱 | ardently love, have deep love for | Dba (及物状态动词) (A transitive verb state) | | ardently love |
| 1290505 | 中国人, 华人 | Chinese | Maae (某一类人个体名词) 中国人 (A noun for person of a specific type) | | |
| 302060117 | 祖国,故国 | motherland, native land, native soil | Mca (一般集体名词) (A general collective noun) | 祖国 | motherland |

TABLE 5

| (Sample sentence) | (Chinese) 中文 | (English) 英文 |
|---|---|---|
| 例句 | 中国人热爱祖国。 | Chinese ardently love the motherland. |
| 句型公式 | Maae + Dba + Mca+。 | Maae + Dba + the + Mca+. |

(Sentence pattern formula)

What is claimed is:

1. A general digital semantic database for mechanical language translation, characterized in that all words are decomposed according to part-of-speech characteristics and semantic characteristics to form basic semantic points which cannot be further decomposed; and the basic semantic points are categorized and arranged orderly in sequence according to semantic characteristics, part-of-speech characteristics, contextual backgrounds and syntactic relationships; and two or more languages are configured at the basic semantic points according to synonym relationships; and free interchange between languages is performed by using a machine according to basic semantic points; and according to grammatical rules and commands of syntactic formulae, the machine can perform rearrangement in sequence by using semantic meanings of various languages configured in the semantic database and formulae of syntactic relationships so as to accomplish automatic translation that fits language patterns of various different languages; the general digital semantic database for mechanical language translation is "digital", which means all basic semantic points in the semantic database are each allocated with a set of digits in order to differentiate all basic semantic points in the digital semantic database from one another; and the sets of digits are all different from one another; the sets of digits in a next level of groups are increased by 2 digits; and the first digits of all sets of digits within the same level of groups are the same but different in different levels of grows; and within the same level of groups, sets of digits in the first level are the same in their first digits and those in the second level are the same in their first two digits and those in the third level are the same in their first four digits, so and so forth; and regardless of number of levels of groups, a set of digits in any level should have its digits prior to the last two digits being the same as the set of digits from which it is expanded; and within the same level of groups, a parallel relationship is established between sets of digits which are only different in their last two digits, a subordinate relationship is established between sets of digits which are different in their first two digits and if the sets of digits are different in their first digits, they belong to different levels of groups and the relationship between them is called a cross relationship; and thus a machine digital semantic database is constituted.

2. The general digital semantic database for mechanical language translation as in claim 1, characterized in that it is "general", which means sets of digits, basic semantic points, decomposition of parts of speech and semantic meanings, semantic characteristics, part-of-speech characteristics, contextual backgrounds and syntactic relationships are applicable to any language.

3. The general digital semantic database for mechanical language translation as in claim 1, characterized in that "semantic meaning" among the three major elements of a word, namely "phonetic sound, visual form and semantic meaning", is used as a subject for preparation of semantic meanings in the general digital semantic database; and a digital semantic database is formed by decomposing existing words to establish basic semantic points which cannot be further decomposed; and a digital semantic database is formed by categorizing all the basic semantic points according to scopes to which their semantic characteristics belong and their subordinate relationships and then arranging them orderly in sequence.

4. The general digital semantic database for mechanical language translation as in claim 1, characterized in that the basic semantic points are associated with two or more languages according to synonym relationships; and each semantic meaning is associated with only one semantic point but there can be more than one word; and all synonyms are associated with only one basic semantic point, which is associated with all synonyms of the same semantic meaning in a corresponding language.

5. The general digital semantic database for mechanical language translation as in claim 1, characterized in that in the decomposition of parts of speech and semantic meanings, high part-of-speech zones, middle part-of-speech zones and low part-of-speech zones are determined according to the parts of speech of the basic semantic points; and twelve parts of speech are determined as high part-of-speech zones according to grammatical rules; and if there are different basic semantic points carrying different semantic meanings for one and the same word within one and the same part-of-speech zone, set up several middle part-of-speech zones and lower part-of-speech zones according to the number of basic semantic points there are so that all the basic semantic points in the semantic database are neither repeated nor inadequate.

6. The general digital semantic database for mechanical language translation as in claim 5, characterized in that in relation to the part-of-speech characteristics, different parts of speech of the part-of-speech zones in the general digital semantic database are identified with different colours; and each part of speech is marked with one colour; and for a mixture of two parts of speech, a word in a mixture of both verb and noun is identified by a mixture of the colour of the original part of speech and the varied part of speech.

7. The general digital semantic database for mechanical language translation as in claim 5, characterized in that in respect of the syntactic relationships, syntactic formulae are prepared according to the parts of speech of the part-of-speech zones to which basic semantic points belong; and a machine performs automatic language translation according to the commands of syntactic formulae; and each language has its own syntactic formula; and two languages are both common and different in some aspects; and the different aspects are subject to adjustment according to syntactic formulae, and the machine then performs interchange in sequence.

8. The general digital semantic database for mechanical language translation as in claim 1, characterized in that the part-of-speech characteristics and semantic characteristics are determined according to the part-of-speech characteristics of the basic semantic points and also the grammatical functions and nature of combination of different parts of speech; and the semantic characteristics are based on the nature of subordinate relationships, parallel relationships, cross relationships and opposite relationships between semantic meanings; and the position arranged for each basic semantic point in the general semantic database is determined according to the part-of-speech characteristics and semantic characteristics.

9. The general digital semantic database for mechanical language translation as in claim 1, characterized in that the contextual background is determined by first establishing several scopes according to the semantic meaning properties of the basic semantic points so that the scopes to which the basic semantic points belong and subordinate relationships are determined by the properties and connotations of semantic meanings and also the extended range, and the contextual background is determined from the scopes to which the basic semantic points belong.

* * * * *